Patented Sept. 25, 1934

1,974,821

UNITED STATES PATENT OFFICE 1,974,821

OCTOIC ACID DERIVATIVES OF PHENOLS

Lucas P. Kyrides, St. Louis, Mo., assignor, by mesne assignments, to Monsanto Chemical Company, a corporation of Delaware No Drawing. Application July 20, 1931, Serial No. 552,072

7 Claims. (Cl. 260—154)

This invention relates to a novel class of phenolic compositions characterized in that they are alpha-ethylhexoic (ethylbutylacetic) acid derivatives of phenols.

The manufacture of alpha-ethylhexoic acid from the corresponding alcohol is already known. The compositions contemplated by the present invention may be prepared conveniently by reacting the alpha-ethylhexoic acid or its acid chloride with a phenol to form the corresponding ester and subsequently subjecting the ester to rearrangement, as by the Fries or Nencki reactions, to form the corresponding ketone derivative. The ketone in turn may be reduced by means of the Clemmensen reaction to the alkyl derivative. Various phenols may be employed including monohydroxy benzene, the cresols, catechol, resorcinol, hydroquinone, etc.

The following examples will serve to illustrate methods of preparing representative compositions contemplated by the present invention (the term octyl being used to designate the following radical:

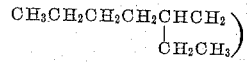

*Example 1.*—Octoyl resorcinol (alpha-ethylhexoylresorcinol) having most probably the following structural formula:

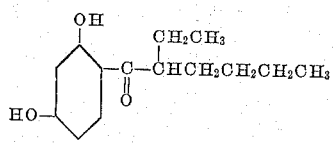

may be prepared by adding slowly and with agitation 45 parts of resorcinol to a solution consisting of 65 parts zinc chloride dissolved in 150 parts octoic acid

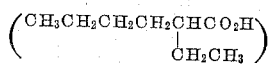

while maintaining a temperature of 125–135° C. After three hours the reacted mixture is diluted with water and the resulting two layers are separated. The non-aqueous layer containing the ketone is purified by distillation, preferably in vacuo—the yield being approximately 91 parts by weight of the ketone. The ketone is a liquid boiling at about 186° C. at 8 mm. and gives a deep red coloration with ferric chloride solution.

*Example 2.*—Octyl resorcinol (beta-ethylhexylresorcinol)

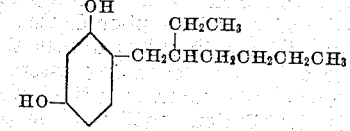

may be obtained by reducing the ketone produced according to Example 1 preferably by the Clemmensen method which consists in subjecting the ketone to the action of amalgamated zinc and dilute hydrochloric acid. The reduction proceeds smoothly, yielding a product which when washed with water and distilled in vacuo boils at 181° C. at 8 mm. pressure. The product is a white crystalline compound which melts at 50° C. and gives a greenish yellow coloration in alcoholic solution with ferric chloride. It is readily soluble in benzene and alcohol and difficultly soluble in water.

*Example 3.*—The analogous octoylmetacresol derivative is made conveniently by causing the cresyl octoate to undergo the Fries isomerization. For this purpose the octoate may be made by mixing equal mol. proportions of octoyl chloride (ethylbutylacetylchloride) and metacresol in an inert solvent such as benzene. The mixture is refluxed until the evolution of hydrogen chloride ceases after which it is washed with dilute caustic soda and the benzene is separated by distillation, preferably in vacuo. A good yield of octoic ester having a boiling point of approximately 115° C. at 6 mm. is thus obtained. The same product is also formed when octoic acid and metacresol are caused to react in the presence of phosphorous oxychloride.

The ketone (octoyl metacresol) may be formed by heating equal parts of metacresyl octoate and aluminum chloride to 160° for 1–2 hours. The reacted mixture is then boiled for a short time with dilute hydrochloric acid. The product in the form of an oil separates as a distinct layer. Some of the oily product is present in the aqueous fraction which may be recovered therefrom by extraction with benzene. The product is purified by fractionation. It has a boiling point of approximately 138° C. at 8 mm; is neutral to phenolphthalein; does not consume alkali when boiled in an alcoholic solution thereof and gives a strong positive test with ferric chloride in alcoholic solution.

*Example 4.*—The octyl metacresol corresponding to the octyl metacresol described in Example 3 may be formed by reducing the ketone according to the Clemmensen method. To this end the ketone is refluxed with zinc amalgam and dilute hydrochloric acid. If the reduction is found to be incomplete after 30–40 hours as evidenced by the ferric chloride test a small amount of alcohol may be added thereto and the reduction continued for 24 hours longer. After this period the reduction will be found to be complete. Water is then added to the mixture and the oil which forms a layer is then separated. The water fraction may be extracted with benzene to recover any dissolved oil. The crude oily product is separated from the benzene by fractionaton and upon purification by distillation will be found to have a boiling point of 138° C. at 9 mm. The colorless liquid thus obtained did not crystallize upon cooling in an ice salt mixture. The product is neutral to phenolphthalein and gives only a faint yellow coloration with ferric chloride, thus indicating the absence of unreduced ketone.

By substituting other phenolic compounds such as catechol, hydroquinone, phenol, etc., for those specifically set forth in the examples above, one may produce the corresponding esters, ketones and alkyl derivatives containing the alpha-ethylhexyl radical. Various methods for preparing these derivatives may be employed following by analogy those employed heretofore for the preparation of other phenolic esters, ketones and alkyl phenolic derivatives.

These compounds, particularly the ketones and alkyl derivatives have been found to have valuable therapeutic properties, and may be employed advantageously as germicides and bactericidal agents. The inordinately high phenol coefficient of these products notably of the octylresorcinol derivative is unexpected since it has, heretofore, been considered that only the normal alkyl phenolic bodies possess high phenolic coefficients. When used as internal disinfectants and germicides, these materials may be dissolved in a mixture of water and alcohol, glycerin, glycol, etc.

From the foregoing description it should be apparent that I have provided a novel class of phenolic compositions characterized in that they contain a beta-ethylhexyl radical which forms esters, ketones and alkyl derivatives of phenolic bodies.

What I claim is:
1. A phenol containing a beta-ethylhexyl group.
2. Beta-ethylhexylresorcinol.
3. Beta-ethylhexylcatechol.
4. Beta-ethylhexylhydroquinone.
5. A phenol containing a group of the formula

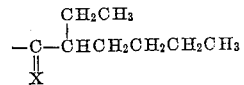

where X represents O or H₂ the said group being substituted in the ring of the phenol.

6. A compound of the formula

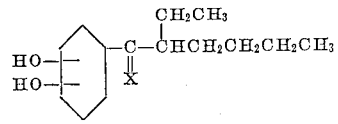

where X represents O or H₂.

7. A dihydroxy benzene composition embodying a group having the following formula:

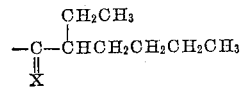

where X represents O or H₂ said group being substituted in the benzene nucleus.

LUCAS P. KYRIDES.